(12) United States Patent
Wiercinski et al.

(10) Patent No.: US 9,476,196 B2
(45) Date of Patent: *Oct. 25, 2016

(54) WATERPROOFING MEMBRANE (71) Applicant: W. R. Grace & Co.-Conn., Columbia, MD (US)

(72) Inventors: Robert A. Wiercinski, Lincoln, MA (US); Anandakumar Ranganathan, Lexington, MA (US); Xia Cao, Acton, MA (US); Robert Paul, Maynard, MA (US)

(73) Assignee: GCP Applied Technologies Inc., Cambridge, MA (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/353,676

(22) PCT Filed: Oct. 25, 2012

(86) PCT No.: PCT/US2012/061802
§ 371 (c)(1),
(2) Date: Apr. 23, 2014

(87) PCT Pub. No.: WO2013/063197
PCT Pub. Date: May 2, 2013

(65) Prior Publication Data
US 2015/0052847 A1   Feb. 26, 2015

Related U.S. Application Data

(60) Provisional application No. 61/551,092, filed on Oct. 25, 2011.

(51) Int. Cl.
*E04B 1/66* (2006.01)
*C09J 7/02* (2006.01)
(Continued)

(52) U.S. Cl.
CPC ............. *E04B 1/665* (2013.01); *B32B 5/022* (2013.01); *B32B 5/024* (2013.01); *B32B 11/046* (2013.01);
(Continued)

(58) Field of Classification Search
CPC ......... E04B 1/665; E04B 1/64; B32B 27/08; B32B 27/12; B32B 27/302; B32B 27/322; B32B 27/304; B32B 5/022; B32B 11/10; B32B 11/046; B32B 5/024; B32B 38/10; B32B 37/24; E04C 2/24; C09J 133/08
See application file for complete search history.

(56) References Cited

U.S. PATENT DOCUMENTS 3,900,102 A   8/1975   Hurst
4,172,830 A   10/1979   Rosenberg
(Continued)

FOREIGN PATENT DOCUMENTS

EP   0610008   10/1994
JP   1214654   8/1989
(Continued)

OTHER PUBLICATIONS

Andriollo, Form PCT/ISA/210, International Search Report for PCT/US2012/061802, dated Mar. 25, 2013, 3 pages.
(Continued)

*Primary Examiner* — Joshua J Michener
*Assistant Examiner* — Keith Minter
(74) *Attorney, Agent, or Firm* — Craig K. Leon (57) ABSTRACT

Disclosed is a waterproofing membrane that comprises a carrier sheet (layer A); a waterproofing adhesive (layer B); a protective coating (layer C), wherein the protective coating is substantially free of surfactant and comprises an acrylic or methacrylic polymer or copolymer, an inorganic filler and a white pigment; and a releasable material (layer D), wherein the releasable material comprises amorphous nanoscale silica and a polymeric binder. The waterproofing membrane does not require a release liner, binds strongly to concrete cast against it (even after UV exposure), tolerates foot traffic, and withstands immersion in water over an extended period.

19 Claims, 1 Drawing Sheet

(51) Int. Cl.
*E04B 1/76* (2006.01)
*E04G 21/00* (2006.01)
*C09D 131/04* (2006.01)
*C09D 133/08* (2006.01)
*C09J 133/08* (2006.01)
*C09J 135/06* (2006.01)
*B32B 37/24* (2006.01)
*B32B 38/10* (2006.01)
*E04B 1/64* (2006.01)
*E04C 2/24* (2006.01)
*B32B 5/02* (2006.01)
*B32B 11/04* (2006.01)
*B32B 11/10* (2006.01)
*B32B 27/08* (2006.01)
*B32B 27/12* (2006.01)
*B32B 27/30* (2006.01)
*B32B 27/32* (2006.01)

(52) U.S. Cl.
CPC ............... *B32B 11/10* (2013.01); *B32B 27/08* (2013.01); *B32B 27/12* (2013.01); *B32B 27/302* (2013.01); *B32B 27/304* (2013.01); *B32B 27/322* (2013.01); *B32B 37/24* (2013.01); *B32B 38/10* (2013.01); *C09D 131/04* (2013.01); *C09D 133/08* (2013.01); *C09J 7/0228* (2013.01); *C09J 133/08* (2013.01); *C09J 135/06* (2013.01); *E04B 1/64* (2013.01); *E04C 2/24* (2013.01); *B32B 2037/243* (2013.01); *B32B 2255/10* (2013.01); *B32B 2255/26* (2013.01); *B32B 2260/021* (2013.01); *B32B 2260/046* (2013.01); *B32B 2307/728* (2013.01); *B32B 2419/00* (2013.01); *C08L 2201/52* (2013.01); *Y10T 428/24942* (2015.01); *Y10T 428/24967* (2015.01); *Y10T 428/259* (2015.01); *Y10T 428/31667* (2015.04)

(56) References Cited

U.S. PATENT DOCUMENTS

| | | | |
|---|---|---|---|
| 4,215,160 A | 7/1980 | Rosenberg | |
| 4,751,122 A | 6/1988 | May | |
| 4,994,328 A | 2/1991 | Cogliano | |
| 5,254,661 A | 10/1993 | Wilson | |
| 5,316,848 A | 5/1994 | Bartlett | |
| 5,496,615 A | 3/1996 | Bartlett | |
| 5,687,517 A * | 11/1997 | Wiercinski et al. | 52/177 |
| 5,824,401 A * | 10/1998 | Jenkins | B32B 11/04 428/215 |
| 6,335,083 B1 * | 1/2002 | Kasai et al. | 428/143 |
| 6,500,520 B1 | 12/2002 | Wiercinski | |
| 6,514,892 B1 * | 2/2003 | Kasai et al. | 501/34 |
| 2003/0215594 A1 * | 11/2003 | Hamdar et al. | 428/40.1 |
| 2005/0196590 A1 * | 9/2005 | Seth et al. | 428/174 |
| 2008/0152867 A1 * | 6/2008 | Di Pede | 428/141 |
| 2010/0167047 A1 * | 7/2010 | Ise | C08J 7/047 428/336 |
| 2011/0185666 A1 * | 8/2011 | Russell | 52/408 |
| 2013/0104495 A1 * | 5/2013 | Wiercinski | C09J 7/0207 52/741.41 |

FOREIGN PATENT DOCUMENTS

| | | |
|---|---|---|
| WO | 2010048198 | 4/2010 |
| WO | 2011041263 | 7/2011 |
| WO | 2011139455 | 11/2011 |

OTHER PUBLICATIONS

Andriollo, Form PCT/ISA/237, Written Opinion of the International Searching Authority for PCT/US2012/061802, dated Mar. 25, 2013, 5 pages.

* cited by examiner

WATERPROOFING MEMBRANE

FIELD OF THE INVENTION

The present invention relates to a waterproofing membrane that does not have a removable release sheet to prevent the adhesive portion of the membrane from adhering to the carrier sheet or other portion of the membrane when the membrane is rolled up.

BACKGROUND OF THE INVENTION

Sheet-like waterproofing membrane laminates are well-known for application to concrete and other substrates. These laminates typically comprise a carrier sheet and a pressure sensitive adhesive layer. In many applications, the waterproofing sheet material is applied to a concrete substrate that has already been formed, such as a building foundation. In such a case, the adhesive layer of the membrane is applied against the cured concrete surface. In another technique, the waterproofing membrane is affixed to the concrete form or lagging with the carrier sheet against the lagging and the adhesive portion facing toward the cavity in which the concrete is poured. The adhesive portion of the membrane will adhere to the freshly poured concrete, thus providing a fully adhered waterproofing membrane on the cured concrete surface after the lagging is removed. This technique is sometimes referred to as "blind side" (or pre-applied) waterproofing. A similar process may be used on horizontal surfaces where the membrane is applied to compacted soil or gravel or to a concrete slab, with the adhesive portion facing upward, then casting concrete against the membrane.

In addition to the carrier sheet and pressure sensitive adhesive layer, typical commercial waterproofing membranes include a removable release sheet that is used to prevent the adhesive portion of the membrane from adhering to the carrier sheet or other portion of the membrane when the membrane is rolled up. This release sheet must be removed from the membrane prior to or during installation and disposed in the trash, thus creating environmental waste.

U.S. Pat. No. 3,900,102 (Hurst) discloses one such membrane comprising a polyethylene support sheet, a bituminous adhesive and a releasable siliconized paper for protecting the adhesive. The release paper is removed as the membrane is unrolled and adhered to a building substrate (see Hurst FIG. 4). U.S. Pat. No. 4,751,122 (May) discloses a membrane laminate that includes a sheet-like paper substrate with a release coating (e.g., silicone) on one face and a waterproofing pressure sensitive adhesive on the other face. This membrane also includes a removable strip along the edge which, when removed, permits overlapping seams to adhere. U.S. Pat. No. 4,172,830 (Rosenberg) and U.S. Pat. No. 4,215,160 (Rosenberg) disclose paperless membrane laminates that include a silicone release coating on the outer surface of the carrier sheet to prevent the adhesive layer from adhering to the carrier sheet when the membrane is rolled up. U.S. Pat. No. 5,254,661 (Wilson) discloses a similar type of paperless membrane laminate in which the release coating is a water-based silicone emulsion. During installation, edge portions of the release coating may be removed by wet abrasion to permit adhesion of overlap seams of adjacent membranes.

U.S. Pat. No. 4,994,328 (Cogliano) discloses a waterproofing membrane capable of adhering to freshly poured concrete (i.e., blind-side or pre-applied waterproofing). The membrane has a bituminous adhesive layer that is coated with a non-tacky, water-insoluble polymeric coating such as, for example, a polyvinyl alcohol, silica, and glycerin mixture in a weight ratio of 1:10:0.5. The coating purportedly protects the adhesive layer while permitting a strong adhesive bond to freshly poured concrete. However, the coating can be slippery when wet and, thus, not suitable for foot traffic. U.S. Pat. No. 5,316,848 (Bartlett) discloses a similar blind-side waterproofing membrane that includes a carrier layer, a pressure sensitive adhesive layer, and a protective coating on the adhesive layer, wherein the coating may be selected from various types of polymers, preferably an acrylic-based elastomer, such as styrene butyl acrylate. U.S. Pat. No. 5,496,615 (Bartlett) discloses a similar membrane laminate where the protective coating has a finely divided particulate material, such as sand, calcium carbonate, cement, titanium dioxide, etc., dusted thereon. The Bartlett patents suggest it is preferred that the protective coating is elastomeric (meaning it will stretch to at least twice its original length and return to approximately its original length), has a penetration greater than 30 dmm, and includes carbon black. The exemplified Bartlett membranes exhibit poor bond to concrete after exposure to UV radiation.

U.S. Pat. No. 6,500,520 (Wiercinski) discloses a membrane laminate having a carrier support sheet, an adhesive layer, and embedded on the adhesive layer a layer of granulated inorganic particulates capable of reacting with concrete, such as aluminum oxide trihydrate, silica dioxide, fly ash, blast furnace slag, alkali or alkaline earth metal salts, etc. The particles may be attached to the adhesive layer using a water-soluble material such as ethylene vinyl acetate or polyvinyl alcohol.

Typical commercial waterproofing membranes used for blind-side (or pre-applied) applications include a release sheet and unroll wrong side up with the adhesive portion facing outward. This forces the installer to first unroll then flip over a large, unwieldy membrane prior to installing it. Alternatively, two installers are needed to lift the heavy roll so that it may be unrolled from the top. The need to remove and dispose of a release liner requires additional labor and creates a considerable amount of trash, the disposal of which has significant monetary and environmental costs.

WO 2010/0488198 (Wiercinski) discloses a waterproofing membrane that does not require a release liner. The membrane comprises four laminated layers that may be arranged in various ways, including one embodiment (embodiment C-D-A-B) where the layers are arranged in the following sequence: carrier sheet, waterproofing adhesive, protective coating and releasable bonding material. The releasable bonding material may comprise a water-soluble polymer, an alkali soluble polymer, or a homopolymer or copolymer of polyvinyl acetate. The protective coating comprises a particulate inorganic material and a weatherable elastomer or weatherable pressure sensitive adhesive. It has been found that some of these four layer membranes can potentially delaminate when subjected to an unusually extreme condition of water immersion over an extended period.

WO 2011/041263 (Wiercinski) discloses a three-layer waterproofing membrane that comprises a carrier sheet, a waterproofing adhesive, and a protective coating layer comprising a homopolymer of polyvinyl acetate. The waterproofing membrane may or may not include a release liner.

It would be advantageous to provide a waterproofing membrane that binds strongly to concrete cast against its surface, even after UV exposure. In addition, it would be advantageous to provide a waterproofing membrane that has an outer surface that will tolerate foot traffic. It would also be advantageous to provide a waterproofing membrane that does not require a release sheet that must be removed and disposed of at the job site. In addition, it would be advantageous to provide a waterproofing membrane that is right side up (i.e., carrier sheet facing down and adhesive/protective coating facing up) when it is unrolled at the job site. More importantly, it would be advantageous to provide a waterproofing membrane that will withstand extraordinary environmental conditions such as water immersion over an extended period.

SUMMARY OF THE INVENTION

The present invention embraces a waterproofing membrane comprising the following laminated layers:
layer A comprising a carrier sheet;
layer B comprising a waterproofing adhesive;
layer C comprising a protective coating; and
layer D comprising a releasable material.

The membrane preferably does not include a removable release sheet that is typically used to prevent the adhesive from adhering to the carrier sheet or other portion of the membrane when the membrane is rolled up.

In a preferred embodiment, the releasable material (layer D) comprises amorphous nanoscale silica and a polymeric binder. Preferably, the binder comprises a water soluble polymer, an alkali soluble polymer, or a homopolymer or copolymer of polyvinyl acetate. In a preferred embodiment, the protective coating (layer C) comprises an acrylic or methacrylic polymer or copolymer, an inorganic filler, and a white pigment, and will also be substantially free of surfactant.

The present invention also embraces a method of waterproofing a concrete structure comprising applying a waterproofing membrane as described herein to a building substrate or concrete form with the releasable material (layer D) of said membrane facing the area into which the concrete will be cast, and casting concrete such that it contacts the releasable material of the membrane.

DETAILED DESCRIPTION OF THE INVENTION

Figure 1:
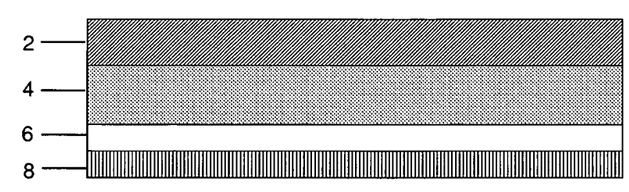
FIG. 1 depicts a cross-section of an embodiment of the invention.

One embodiment of the waterproofing membrane of the present invention is depicted in FIG. 1, which shows a cross-section of the membrane taken along the width of the membrane. Typical commercial membranes will have a width in the range of 30 to 185 cm, more typically 60 to 140 cm, preferably 80 to 130 cm. They typically will have a length of from 5 to 60 m, more typically 15 to 36 m, and are rolled up into a roll.

As shown in FIG. 1, the waterproofing membrane comprises four laminated layers arranged in the sequential order A-B-C-D wherein
layer A comprises a carrier sheet 2;
layer B comprises a waterproofing adhesive 4;
layer C comprises a protective coating 6; and
layer D comprises a releasable material 8.

Layer A comprises a carrier sheet 2. The carrier sheet provides mechanical strength and waterproofing integrity for the membrane. The carrier sheet typically will have a thickness of about 0.05 to 2.0 mm, preferably about 0.3 to 1.0 mm. Generally, it is preferred that the bottom face of the carrier sheet (i.e., the face that contacts the releasable material 8 (layer D)) have a surface tension of 40 dynes/cm or less, preferably 35 dynes/cm or less. The carrier sheet should comprise a generally smooth surface to provide for easy release of the bonding material. Smooth surfaces include films, sheets, and extrusion coated woven and nonwoven fabrics. Suitable materials for films and extrusion coatings include polypropylene, polyethylene, ethylene-propylene copolymers, ethylene-olefin copolymers, ethylene-vinyl acetate copolymers, polyvinyl acetate, polyethyl acrylate, polytetrafluoroethylene (PTFE), polyvinylidene fluoride (PVDF), polyethylene terephthalate (PET), polyvinyl chloride (PVC) and combinations thereof. Polyethylene and polypropylene are preferred. A preferred carrier sheet comprises a thermoplastic film of high density polyethylene (HDPE).

Generally, the carrier sheet is not surface treated to increase the surface tension. However, in some cases it may be desirable to treat the surface of the carrier sheet on which the adhesive will be applied in order to enhance adhesion of the adhesive to the carrier sheet. One such surface treatment option is corona treatment. Preferably, the carrier sheet will not be corona treated, particularly the surface of the carrier sheet that comes in contact with the releasable material 8.

Additives may be incorporated into the carrier material to reduce surface tension. These may be incorporated into the bulk of the material in a separate compounding step. The additives may also be incorporated into the bulk of the material during the melt extrusion process to produce a sheet, film, or extrusion coated fabric.

Layer B comprises a waterproofing adhesive 4, which provides waterproofing integrity for the waterproofing membrane. It also bonds the protective coating to the carrier sheet. The waterproofing adhesive may comprise a synthetic (non-bituminous) pressure sensitive adhesive or a rubber modified bitumen pressure sensitive adhesive. The adhesive layer typically will have a thickness of about 0.05 to 2.5 mm, preferably about 0.07 to 2.0 mm, more preferably about 0.1 to 1.0 mm, most preferably about 0.2 to 0.8 mm.

Suitable non-bituminous, or synthetic, pressure sensitive adhesives include butyl rubber based adhesives, polyisobutylene based adhesives, butyl based adhesives, acrylic based adhesives, vinyl ether based adhesives, styrene-isoprene-styrene (SIS) based adhesives, styrene-ethylene-butylene-styrene (SEBS) based adhesives, styrene-butadiene-styrene (SBS) based adhesives, styrene-butadiene rubber (SBR) based adhesives, and combinations thereof. Preferably, the synthetic adhesive is a pressure sensitive hot melt adhesive block copolymer of SIS, SBS or SEBS, most preferably SIS block copolymer. For a more detailed description of pressure sensitive adhesives, see Satas, Handbook Of Pressure Sensitive Adhesive Technology, by Van Nostrand Reinhold Company, Inc. (1982), incorporated herein by reference. Other rubbers include polyisoprene, polybutadiene, natural rubber, polychloroprene rubber, ethylene-propylene rubber, ethylene alpha olefin, nitrile rubbers, and acrylic rubber.

The non-bituminous or synthetic pressure sensitive adhesive can optionally contain typical additives, such as light absorbers (e.g., carbon black, benzotriazoles, etc.), light stabilizers (e.g., hindered amines, benzophenones), antioxidants (e.g., hindered phenols), fillers (e.g., calcium carbonate, silica, titanium dioxide, etc.), plasticizers, rheological additives, and mixtures thereof. Preferred synthetic adhesives contain light absorbers, light stabilizers, and antioxidants.

A rubber modified bitumen pressure sensitive adhesive may also be used. All of the rubbers listed above (e.g., SIS, SBS, SEBS, SBR, etc.) may be blended with bitumen to produce a pressure sensitive adhesive. The rubber modified bitumen may also typically include a processing oil such as an aromatic, naphthenic or paraffinic oil. For unfilled adhesives, the wt. % rubber is about 10% to 22%; the wt. % bitumen is about 43% to 90%; and the wt. % processing oil is about 0% to 35%. The pressure sensitive adhesive may also comprise an inorganic filler such as silica, calcium carbonate, talc, or clay. If present, the wt. % filler may be about 0% to 50% of the total.

Generally, for improved adhesion to post cast concrete it is preferred that the pressure sensitive adhesive has a penetration greater than about 30 decimillimeters (dmm) (150 g, 5 sec., 70° F.) as measured according to ASTM D 5-73, incorporated herein by reference.

The protective coating (layer C) has several functions. It bonds well to both the waterproofing adhesive (layer B) and to the releasable material (layer D). It also is highly reflective and protects the waterproofing adhesive (layer B) against exposure to weather and resulting degradation. It is also operable to bond to concrete in the event that the concrete diffuses through and/or absorbs the releasable layer during the concrete curing process.

To provide for good bond under water immersion conditions and thereby prevent any delamination under such conditions, the protective coating should be substantially free, and preferably completely free, of surfactant. By substantially free is meant that the amount of surfactant should comprise, by weight of polymer in layer C, from 0 to 1.0%, preferably from 0 to 0.5%, more preferably from 0 to 0.1%.

A surfactant is not to be confused with a dispersant. As used herein, a surfactant comprises a hydrophobic moiety (e.g., alkyl, aryl, alkylaryl, and poly-alkoxyl (C3 and higher) groups) and a hydrophilic moiety and is typically used to stabilize an emulsion (e.g., a polymer emulsion during emulsion polymerization). A dispersant, by contrast, does not comprise a hydrophobic moiety and may be included in the protective coating to aid in the dispersion of inorganic particulates, such as fillers and pigments.

It is theorized that the presence of surfactant in the protective coating (layer C) is detrimental to adhesion of the layers under water immersion conditions and can lead to delamination. Surfactant can be introduced inadvertently in layer C depending on the source of the polymer utilized in manufacturing layer C. For example, if one included a polymer made by emulsion polymerization, such polymer necessarily will include high levels of surfactant, which will then become included in layer C. For this reason, it is critical that the protective coating comprises a polymer that is substantially free of surfactant. Such polymer should be manufactured by a process that uses little or no surfactant, such as bulk polymerization, solvent polymerization, or suspension polymerization.

The protective coating is produced from an acrylic or methacrylic polymer (or copolymer), a filler and a white pigment, wherein the pigment volume concentration of the filler plus white pigment is 30% to 80%, preferably 40% to 70%, more preferably 50% to 65%, by volume of total solids (dry). Preferably, the protective coating layer has a penetration ≤20 dmm (ASTM D5, 150 g, 5 sec, 70° F.) and a reflectivity ≥55%, measured by a reflectometer perpendicular to a surface illuminated at a 45° angle. Preferably, the acrylic or methacrylic polymer (or copolymer) has at least 50 wt % acrylic or methacrylic monomer units and has a Tg of −40° C. to 0° C.

Preferably, the polymer comprises, as polymerized units, at least 50 wt %, more preferably at least 75 wt %, of the acrylic or methacrylic monomer. Preferably, the polymer emulsion is prepared by polymerizing one or more alkyl acrylates and/or alkyl methacrylates containing 1-18 carbons per alkyl group. Suitable monomers include, for example, methyl acrylate, ethyl acrylate, propyl acrylate, isopropyl acrylate, butyl acrylate, pentyl acrylate, hexyl acrylate, 2-ethyl hexyl acrylate, nonyl acrylate, lauryl acrylate, methyl methacrylate, ethyl methacrylate, propyl methacrylate, isopropyl methacrylate, butyl methacrylate, pentyl methacrylate, hexyl methacrylate, 2-ethyl hexyl methacrylate, nonyl methacrylate, lauryl methacrylate, behenyl methacrylate, and the like. "Alkyl", as used herein, includes straight chain, branched and cyclic alkyl groups.

In one embodiment of the invention, the (meth)acrylic monomer is co-polymerized with at least one different monomer. By (meth)acrylic is meant herein an acrylic monomer or methacrylic monomer, or combination thereof. Suitable co-monomers include, for example, alpha olefinically unsaturated carboxylic acids containing 3-5 carbons, and esters thereof containing 4-20 carbons; mono-unsaturated dicarboxylic acids containing 4-8 carbons; nitriles selected from alpha olefinically unsaturated nitriles containing 3-5 carbons; polymerizable ethylenically unsaturated mono- and di-carboxylic acids containing 3-8 carbons, and esters thereof containing 4-20 carbons; vinyl esters of carboxylic acids containing 4-22 carbons; a olefins containing 2-12 carbons; styrene and styrene derivatives; and other polyfunctional monomers. Preferred co-monomers include styrene, acrylonitrile, and acrylic acid.

The polymer (or copolymer) in the protective coating layer has a glass transition temperature (Tg) of from −40° C. to 0° C., as calculated using the Fox equation (T. G. Fox, Bull. Am. Physics Soc., Volume 1, Issue No. 3, page 123 (1956)). That is, for calculating the Tg of a copolymer of monomers M1 and M2, $$1/Tg(\text{calc.}) = w(M1)/Tg(M1) + w(M2)/Tg(M2)$$

wherein
Tg(calc.) is the glass transition temperature calculated for the copolymer;
w(M1) is the weight fraction of monomer M1 in the copolymer;
w(M2) is the weight fraction of monomer M2 in the copolymer;
Tg(M1) is the glass transition temperature of the homopolymer of M1; and
Tg(M2) is the glass transition temperature of the homopolymer of M2; with all temperatures being measured in ° K.

Examples of suitable polymers include acrylic elastomers such as HyTemp® polyacrylate elastomers sold by Zeon Chemicals, e.g. HyTemp® 4051.

The protective coating (layer C) provides for good bond to concrete after UV exposure because it is a highly reflective layer that provides for a cooler membrane and, thus, minimizes the rate of pressure sensitive adhesive degradation. In the absence of a highly reflective protecting coating layer, degradation of the pressure sensitive adhesive will occur upon exposure to sunlight, thus reducing the bond to concrete.

Reflectivity is gauged with a reflectometer (NOVO-SHADE 45/0 reflectometer), with the test surface illuminated from a 45° angle and the intensity of scattered light measured at the perpendicular (i.e. 0°). Data is recorded on a grey scale where black is 0% and white is 100%. Only shading is measured, irrespective of color, and is referred to as whiteness. Reflective coatings of the present invention exhibit a value that is greater than or equal to 55%. Preferred coatings exhibit a value that it is greater than or equal to 65%, e.g., 65% to 85%.

The protective coating layer comprises inorganic filler and white pigment. The volume fraction, in the protective coating layer, of filler plus white pigment as a volume % of total solids is referred to as the pigment volume concentration (PVC) and is 30% to 80%. The preferred PVC is 40% to 70%. A most preferred PVC is 50% to 65%.

Suitable inorganic fillers include calcium carbonate, silica, diatomaceous earth, barytes, magnesium silicates, talc, clay, and alumina trihydrate, and mixtures of two or more of these materials. White fillers are preferred. Calcium carbonate is a preferred inorganic filler. The average particle size of the filler is 1 µm to 50 µm, preferably 3 µm to 25 µm.

White pigments are included to increase the reflectivity of the protective coating. A pigment that efficiently scatters visible light, thereby imparting whiteness, brightness and opacity when incorporated into a coating is preferred. Preferred pigments include titanium dioxide, antimony oxide, zinc sulfide, and zinc oxide. An organic hollow sphere pigment, Ropaque, produced by Rohm and Haas, may also be used. Titanium dioxide is most preferred. Titanium dioxide ($TiO_2$) and other white pigments opacify paint films primarily by diffusely reflecting light. This reflection occurs because the white pigment scatters or bends light strongly. If there is enough white pigment in a paint film, almost all visible light striking it (except for a very small amount absorbed by vehicle or pigment) will be reflected, and the film will appear opaque, white, and bright. The volume % of white pigment as a volume % of filler plus white pigment is 5% to 30%.

Generally, the dry coating weight of the protective coating (layer C) will be about 20 $g/m^2$ to 90 $g/m^2$ on a dry solids basis, preferably about 40 $g/m^2$ to 70 $g/m^2$ on a dry solids basis. Typically, layer C will have a thickness (dry) of about 0.005 to 0.10 mm, preferably about 0.008 to 0.08 mm, more preferably about 0.01 to 0.05 mm.

The protective coating may optionally contain typical additives, such as, light absorbers (i.e., carbon black, benzotriazoles, etc.), light stabilizers (i.e., hindered amines, benzophenones), concrete admixtures (e.g., set accelerators, set retarders, superplasticizers, water reducers, shrinkage reducers, corrosion inhibitors, biocides, etc.), dispersants, antifoams, antioxidants (i.e., hindered phenols), and mixtures thereof. Preferred protective coatings will contain light stabilizers and light absorbers.

Layer D comprises a releasable material 8. The releasable material may be any suitable material that will strongly adhere to the protective coating 6, but which will releasably adhere (e.g., minimally adhere or not adhere) to the carrier sheet 2. In other words, the releasable material 8 (layer D) should be capable of being easily detached from carrier sheet 2 (layer A) when the membrane is unrolled. This means that the adhesion of layer D to layer A should be substantially less than the adhesion of layer D to layer C (and also less than the adhesion of layer C to layer B) when the membrane is unrolled. Typically, layer D will have a thickness (dry) of about 0.1 to 20 µm, preferably about 0.5 to 15 µm, more preferably 1 to 10 µm.

In a preferred embodiment, the releasable material (layer D) comprises amorphous nanoscale silica and a polymeric binder. Nanoscale silica typically has a particle size of 0.1 to 100 nm, preferably 1 to 50 nm, more preferably 5 to 30 nm. It has been found that amorphous nanoscale silica provides for maintenance of a good bond between the membrane and concrete cast against it after immersion in water. To test this advantageous property, concrete is cast against a membrane strip and allowed to cure for seven days. The assembly is then immersed in water for 30 days. Bond to concrete after a period of water immersion is measured and compared to that for an assembly that has not been immersed in water. Without being bound by theory, it is believed that the amorphous nanoscale silica particles form hydration products in an alkaline environment like concrete comprising Portland cement. The formation of hydration products during the curing process likely enhances the bond of the membrane to concrete cast against it. The use of amorphous nanoscale silica in the releasable material (layer D) also provides for enhanced blocking resistance (i.e., lower adhesion to the carrier sheet (layer A)) as well as enhanced skid resistance (i.e., resistance to slipping by applicators walking on the wet membrane). Preferably, the coating weight (on the membrane surface) of the releasable material layer comprising nanoscale silica plus binder is 1 $g/m^2$ to 15 $g/m^2$, preferably 2 $g/m^2$ to 10 $g/m^2$, more preferably 3 $g/m^2$ to 6 $g/m^2$.

The binder for use in the releasable material layer may include a water soluble polymer, an alkali soluble polymer, or a homopolymer or copolymer of polyvinyl acetate. The polymer binder should be soluble or dispersible in water because an aqueous mixture of the silica dispersion and binder is needed to produce the releasable material layer. Preferred binders include polyvinyl acetate homopolymer emulsion such as that produced by Celanese under the trade name Dur-O-Set and polyvinyl alcohol. The volume percentage of silica, as a percentage of silica plus polymer binder, is 30% to 90%, preferably 60% to 90%.

Aqueous amorphous nanoscale silica dispersions are sold by W.R. Grace & Co. under the brand name Ludox®. The nanoscale silica particles in LUDOX colloidal silica are discrete uniform spheres of silica with no porosity or detectable crystallinity. Most are dispersed in an alkaline medium which reacts with the silica surface to produce a negative charge. Because of the negative charge, the particles repel one another resulting in stable products at pH 8-11. Some grades contain silica with specially modified surfaces to give broader stability (pH 4-11). During drying, the hydroxyl groups on the surface of the particles condense by splitting out water to form siloxane bonds (Si—O—Si), resulting in coalescence and interbonding. Particle size ranges from 5 nm (nanometers) to 30 nm.

As mentioned above, the binder may include a water soluble polymer, an alkali soluble polymer, or a homopolymer or copolymer of polyvinyl acetate.

In one embodiment, the binder may comprise a water soluble polymer. Suitable water soluble polymers may include polyvinyl alcohol (PVOH), polyethylene oxide (PEO), water soluble cellulosic polymers (e.g., hydroxypropyl methyl cellulose, hydroxyethyl cellulose), hydrolyzed maleic anhydride polymers and copolymers, polyvinylpyrrolidone, sulfonated polystyrene, polysulfoethyl acrylate, poly(2-hydroxyethylacrylate), polyacrylamide, poly(acrylic acid) and alkali metal salts thereof, natural or synthetically modified polysaccharides, proteins, alginates, xanthan gums, and guar gums. The preferred water soluble polymer is polyvinyl alcohol.

In another embodiment, the binder may comprise an alkali soluble polymer. An alkali soluble polymer is defined as a polymer that is insoluble below pH 5 and soluble, or at least partially soluble or swellable, above pH 8. An alkali soluble polymer is a preferred material for the binder because it improves the bond to concrete. Without being bound by any theory, it is postulated that when concrete is cast against the alkali soluble polymer, it may dissolve, partially dissolve, swell, or partially swell by reaction of the hydrophilic monomers with alkaline species like calcium hydroxide within the concrete. The polymer layer may diffuse or partially diffuse into the concrete and bind to the concrete when it sets.

The alkali soluble polymer may comprise one or more hydrophilic monomers and one or more hydrophobic monomers. Hydrophilic monomers are selected from a list including maleic anhydride, a combination of maleic anhydride and a mono-ester/monocarboxylic acid, methacrylic acid, acrylic acid, and vinyl phenol. Hydrophobic monomers are selected from a list including acrylic esters, methacrylic esters, styrene, alpha methyl styrene, alkenes, ethylene, propylene, isobutylene, vinyl chloride, and octadecene.

One type of preferred alkali soluble polymer includes copolymers of styrene and maleic anhydride such as those manufactured by Sartomer. The ratio of styrene to maleic anhydride ranges from 1:1 to 8:1. The number average molecular weight ranges from 2000 to 12,000. Most preferred is SMA 3000 with a styrene:maleic anhydride ratio of 3:1.

Another type of preferred alkali soluble polymer includes copolymers of styrene, maleic anhydride and mono-ester/monocarboxylic acid (e.g., half-ester of maleic anhydride) such as those manufactured by Sartomer. The acid value in milligrams of KOH per gram of polymer ranges from 90 to 300. The number average molecular weight ranges from 2000 to 6000. Most preferred are SMA 2625 and SMA 3840.

A further type of preferred alkali soluble polymer includes acrylic acid and styrene and/or alpha-methyl styrene type polymers manufactured by BASF under the trade name of Joncryl. Most preferred are Joncryl 680 and Joncryl 682.

An additional type of preferred alkali soluble polymer includes reaction products of hydroxypropyl-methyl cellulose such as those manufactured by Shin-Etsu under the trade name of AQOAT. The most preferred is AQOAT ASHG. This is hydroxypropyl methylcellulose acetate succinate.

Another type of preferred alkali soluble polymer includes copolymers of methacrylic acid and methylmethacrylate such as those manufactured by Evonik under the trade name EUDRAGIT®. Most preferred is EUDRAGIT® S 100.

Another type of preferred alkali soluble polymer includes acrylic acid-ethyl acrylate-methyl methacrylate copolymer such as that manufactured by Lubrizol under the trade name Avalure. Most preferred is Avalure 315. A further type of preferred alkali soluble polymer is a copolymer of methyl methacrylate, ethyl methacrylate and acrylic acid. This is commercially available from Lubrizol as Carboset 526. An additional type of preferred alkali soluble polymer is a copolymer of ethyl acrylate, methyl methacrylate, and acrylic acid. This is commercially available from Lubrizol as Carboset 525.

Another example of an alkali soluble polymer is a rosin acid. Yet another example of an alkali soluble polymer is a phenolic resin, such as a condensation product of phenol and formaldehyde. Suitable phenolic resins include phenolic novolac resins such as those manufactured by Georgia-Pacific. Most preferred is Georgia-Pacific resin CK-2400.

Accordingly, a preferred alkali soluble polymer may be selected from the group consisting of copolymers of styrene and maleic anhydride, copolymers of styrene, maleic anhydride and half-ester of maleic anhydride, copolymers of acrylic acid and styrene and/or alpha-methyl styrene, hydroxypropyl methylcellulose acetate succinate, copolymers of methacrylic acid and methyl methacrylate, copolymers of methyl methacrylate, ethyl methacrylate and acrylic acid, copolymers of ethyl acrylate, methyl methacrylate, and acrylic acid, a rosin acid, a phenolic resin, and combinations of one or more of these.

Releasable coating material comprising nanoscale (colloidal) silica and an alkali soluble polymer is preferably applied as a mixture of an alkaline solution of the polymer and colloidal silica. The preferred base to produce a solution of the alkali soluble polymer is aqueous ammonia.

In a further (and most preferred) embodiment, the binder may comprise a homopolymer or a copolymer of polyvinyl acetate (PVAc). Polyvinylacetate homopolymer emulsions are produced by Celanese under the trade name of Dur-O-Set®.

The proposed mechanism by which polyvinyl acetate homopolymer bonds to concrete cast against it is somewhat different than the mechanism proposed above for bonding of copolymers comprising acrylic acid, methacrylic acid, vinyl phenol, or maleic anhydride. While not being bound by any theory, it is believed that the polyvinyl acetate hydrolyzes to form polyvinyl alcohol while in contact with highly alkaline concrete. The water soluble polyvinyl alcohol dissolves in the concrete and becomes intimately bonded with the concrete once the concrete has set. Since the polyvinyl acetate is not easily hydrolyzed at lower pH, e.g. pH 7, it cannot be washed off by rain. The polyvinyl acetate binder is also non-tacky and will not bond well to the carrier sheet (layer A), thus permitting easy unrolling of the membrane and eliminating the need for a release liner.

The binder may also comprise a copolymer of vinyl acetate (i.e., polyvinyl acetate copolymer). Such copolymers preferably have a glass transition temperature greater than or equal to 5° C., more preferably greater than or equal to 10° C. Such copolymers preferably comprise at least 50%, more preferably at least 70%, vinyl acetate.

Copolymers of vinyl acetate include copolymers of vinyl acetate with ethylene, copolymers of vinyl acetate with acrylic esters, including methyl acrylate, ethyl acrylate, butyl acrylate, and ethyl-hexyl acrylate, copolymers of vinyl acetate and vinyl versatate, and copolymers of vinyl acetate and vinyl laurate.

Copolymers of vinyl acetate and acrylic ester are available from several commercial sources, including, for example, UCAR 162 and UCAR 357 (Dow Chemical) and Flexbond® 325 and Flexbond® 381 (Air Products). Copolymers of vinyl acetate and ethylene with high vinyl acetate content are available from Air Products under the tradename Airflex®. Copolymers of vinyl acetate and vinyl versatate are available from Celanese under the trade names Celvolit 2456 and Mowilith LDM 2110.

Releasable material comprising nanoscale (colloidal) silica and an aqueous emulsion of polyvinyl acetate homopolymer or copolymer may be applied to a web in a continuous process.

A suitable process to manufacture a waterproofing membrane of the present invention comprises the steps:
(S1) coating the releasable material (layer D) onto a plastic film and drying;
(S2) coating the protective coating (layer C) onto the releasable material (layer D), drying and winding into a roll;
(S3) coating the waterproofing adhesive (layer B) onto the carrier sheet (layer A);
(S4) unwinding the three layer roll comprising layer C, layer D, and the plastic film and laminating layer C to layer B; and (S5) removing the plastic film from layer D and winding the four layer construction comprising layer D, layer C, layer B, and layer A into a roll (layer A is on outside of roll).

The releasable material 8 (layer D) (e.g., as a mixture of colloidal silica and an aqueous emulsion or an aqueous solution of the binder, depending on the binder type) may be applied to the plastic film by any one of a variety of applicators, including wire wound rod, roll coater, knife over roll coater, gravure, or slot die coater. If the plastic film is not very smooth, a slot die coater is preferred in order to apply a uniformly thick coating. The coated releasable material is typically dried in a forced hot air oven.

The protective coating 6 (layer C) may be applied to the releasable material 8 (layer D) by any one of a variety of applicators including wire wound rod, roll coater, knife over roll coater, gravure, or slot die coater. If the carrier sheet is not very smooth, such as an extrusion coated fabric, a slot die coater is preferred in order to apply a uniformly thick protective coating. The coated protective coating is typically dried in a forced hot air oven. The protective coating may be applied as a solution comprising an organic solvent, polymer, pigment, and filler (i.e., particulate inorganic material); or as a 100% solids composition comprising polymer, pigment, and filler. An organic solvent composition is preferred.

The waterproofing adhesive 4 (layer B) may be applied as a hot melt, an organic solvent based coating, or an aqueous coating. Hot melt coating is preferred. A hot melt coating may be applied by slot die, knife over roll coater or hot melt coater. Solvent or water based coatings may be applied by the same methods as well as wire wound rod application.

When the roll of waterproofing membrane is unwound, the releasable bonding material (layer D) releases from the carrier sheet (layer A) and remains adhered to the protective coating (layer C), which is now adhered to the adhesive (layer B). Thus, after unrolling, the membrane has its layers arranged in the order D-C-B-A (with layer A on the bottom and layer D facing upward). This is a particularly unique feature of the present invention. Unrolling is affected without the need for a silicone treated surface and or a separate silicone coated release liner. The first and last unwraps from the roll may need to be discarded.

EXAMPLES

The invention may be further illustrated by the following examples, which are not to be construed as limiting the scope of the invention. In these examples, the following materials are used:

HyTemp® 4051 acrylic rubber (Tg −18° C.)
Ludox® AS 40 amorphous colloidal silica dispersion (40% solids, average particle size 22 nm)
Dur-O-Set® C-310 is a 55% solids polyvinyl acetate emulsion (Celanese).
Celvol® 203-24 is a 24% solids solution of polyvinyl alcohol and water
Tinuvin® 292 is a hindered amine light stabilizer (Ciba-Geigy).
Dispers-ayd® 15 is a dispersant
Calcium carbonate with an average particle size of 5 μm
Titanium dioxide
Ethyl acetate
Heptane
UCAR®123 is an acrylic emulsion
Rhoplex® 1791 is an acrylic emulsion
Acronal® 5400 is a styrene acrylic emulsion
Acronal® 567 is a styrene acrylic emulsion
ADVA 190 is a dispersant
Tamol 165 is a dispersant
RM 825 is a thickener
KTPP is potassium pyrophosphate
Tinuvin® 400 DW is a UV absorber In addition, the following test procedures are used:

Bond to Concrete: Since waterproofing membranes are normally subject to exposure to sunlight prior to concrete being cast, it is highly desirable that such membranes maintain their ability to adhere to concrete after such exposure. Adhesion of the membranes to concrete is tested by casting concrete against the outer face (i.e., the releasable material layer) of 2 in×6 in (5 cm×15 cm) membrane samples, allowing the concrete to cure for seven days, then measuring peel adhesion with an Instron mechanical tester at a peel angle of 90° and a peel rate of 2 in (5 cm)/min. Bond to concrete is measured for samples not exposed to UV radiation (initial) and for samples exposed to UV radiation prior to casting concrete, where the UV exposure uses the EMMAQUA accelerated test in which the exposure corresponds to the equivalent of one month UV exposure (28 mj) or two months UV exposure (56 mj).

Blocking Resistance: Since waterproofing membranes are normally wound into a roll, it is highly desirable to insure that one surface of the membrane (i.e., the releasable material layer) does not strongly adhere to the other surface of the membrane (i.e., the carrier sheet). Otherwise, it will be difficult to unwind the roll. To test blocking resistance, a layer of 16 mil (0.4 mm) HDPE is placed on the outer surface (i.e., the releasable material layer) of a 1.25 in×7 in membrane sample, a 5 psi (70 g/cm$^2$) load is placed on top, then this assembly is placed in an oven at 150° F. (66° C.) for 10 days. After cooling to room temperature, each sample is tested with a T-peel test using an Instron mechanical tester using a cross head speed of 2 in (5 cm)/min. Blocking is measured as pounds per lineal inch (pli).

Water Immersion: Since waterproofing membranes may be immersed in water after being cast against concrete, it is highly desirable that such membranes maintain their ability to adhere to concrete after such exposure. An extremely severe test has been devised to illustrate the exceptional performance of membranes of the present invention. Adhesion of the membranes to concrete is tested by casting concrete against the outer face (the releasable material layer) of 0.5 in×6 in (1.3 cm×15 cm) membrane samples, allowing the concrete to cure for seven days, immersing the assembly in water for 30 days, then measuring peel adhesion with an Instron mechanical tester at a peel angle of 90° and a peel rate of 2 in (5 cm)/min. Water may infiltrate between any of the interfaces of the assembly including the concrete/releasable material layer interface, the releasable material/protective coating interface, or the protective coating/pressure sensitive adhesive interface. This test is considered severe because in normal usage of the membrane these interfaces would not be exposed to infiltration by water.

Coatings: coatings used to prepare membranes are described below. The substantially surfactant-free protective coating (layer C) used for all membranes of the invention comprises 7% acrylic rubber (HyTemp® 4051), 34.7% calcium carbonate, 5% titanium dioxide, 2% Tinuvin® 292, 0.3% Dispers-ayd® 15, and 51% organic solvent (ethyl acetate/heptane 3/1). The dry coating (free of solvent) has a pigment volume concentration (PVC) of 61.4. This is referred to as coating number P1 in results tables below.

For comparison, a number of protective coatings comprising surfactant are formulated with aqueous polymer emulsions, as shown in Table 1 below, and identified as P2c to P6c.

TABLE 1

| | Comparative Protective Coating No. | | | | |
|---|---|---|---|---|---|
| | P2c | P3c | P4c | P5c | P6c |
| Emulsion type | UCAR | Rhoplex | Rhoplex | Acronal | Acronal |
| Polymer Tg ° C. | 123 −17 | 1791 −40 | 1791 −40 | S400 −6 | 567 −6 |
| Emulsion wt. | 17.1 | 28.4 | 18.2 | 26.2 | 25.7 |
| TiO$_2$ | 16.1 | 14.0 | 15.8 | 14.2 | 14.3 |
| CaCO$_3$ 5 μm | 48.2 | 41.9 | 47.4 | 43.6 | 42.8 |
| Adva 190 | 0.3 | | | | |
| Tamol 165 | | 0.6 | 0.5 | 0.5 | 0.5 |
| Tinuvin 292 | 0.2 | 0.3 | 0.2 | 0.3 | 0.3 |
| Tinuvin 400 DW | 1.0 | 1.4 | 1.0 | 1.4 | 1.4 |
| RM 825 thickener | 0.1 | 0.1 | 0.1 | 0.1 | 0.1 |
| KTPP 20% soln | 0.3 | | 0.3 | | 0.3 |
| Water | 16.8 | 13.3 | 16.5 | 13.7 | 14.7 |
| Total | 100.0 | 100.0 | 100.0 | 100.0 | 100.0 |
| PVC | 68.3 | 57.2 | 67.9 | 57.1 | 57.9 |

Comparative protective coatings P2c to P6c are prepared by first preparing a pigment grind comprising water dispersant, titanium dioxide and calcium carbonate at 2500 RPM with a Cowles dissolver with a 3 inch blade. The KTPP solution is then added and mixed for 5 min at low speed. The remaining ingredients are added and mixed at low speed for 5 min.

Three different coatings are used for the releasable material (layer D). The first comprises 25% Dur-O-Set® C-310 and 75% water. The dry coating (free of water) has a pigment volume concentration of zero. This is referred to in the tables below as PVAc. The second comprises 30.8% Ludox® AS 40, 7.7% Dur-O-Set® C-310, and 61.5% water. This has a pigment volume concentration of 62 and is referred to in the tables below as PVAc-silica. The third comprises 46.7% Ludox® AS 40, 6.7% of the 24% polyvinyl alcohol solution (Celvol® 203), and 46.7% water. This has a pigment volume concentration of 87 and is referred to in the tables below as PVOH-silica.

Membrane preparation: To prepare a membrane, the the releasable material (layer D) is coated onto an untreated 4 mil (0.1 mm) HDPE film with a wire wound rod. The rod is selected to achieve the desired coating weight. The coated sheet is dried for 5 minutes in an oven at 150° F. (66° C.). The protective coating (layer C) is coated onto the dry releasable material layer with a drawdown bar. The gap for the drawdown bar is selected to achieve the desired coating weight. The coated sheet is dried for 5 minutes in an oven at 150° F. (66° C.) to produce a three layer laminate comprising protective coating layer, releasable material layer, and HDPE film.

A sheet of 16 mil (0.4 mm) HDPE is coated with 15 mils (0.38 mm) of SIS based pressure sensitive adhesive (formulation shown below).

TABLE 2

| Kraton 1163 | 27.3 |
|---|---|
| Escorez 1310-LC | 56.5 |
| Shellflex 371 Oil | 14.7 |
| Irganox 1010 | 1.0 |
| Tinuvin 328 | 0.5 |

The adhesive face of this coated sheet is applied to the protective coating layer on the three layer laminate described above to produce a five layer construction comprising HDPE carrier sheet, waterproofing pressure sensitive adhesive, protective coating layer, releasable material layer, and HDPE film. The HDPE film is peeled from this five layer construction, whereby the highly releasable material releases easily from the HDPE leaving a four layer structure comprising HDPE carrier sheet, waterproofing adhesive, protective coating, and releasable material.

Results for initial bond to concrete, bond to concrete after one month water immersion including failure mode, and blocking resistance are listed in Table 3 below.

TABLE 3

| No. | Protective Coating Wt g/m$^2$ | Protective Coating No. | Releasable Coating Composition | Releasable Coating PVC | Releasable Coating Wt g/m$^2$ | Initial BTC pli | Blocking (pli) | BTC after Immersion ½" pli | Failure Mode |
|---|---|---|---|---|---|---|---|---|---|
| 1 | 53 | P1 | PVAc/Silica | 30 | 2.5 | 11.6 | 0.08 | NT | NT |
| 2 | 54 | P1 | PVAc/Silica | 80 | 2.5 | 16.0 | NT | NT | NT |
| 3 | 65 | P1 | PVAc/Silica | 62 | 2 | 15.3 | 0.06 | NT | NT |
| 4 | 32 | P1 | PVOH/Silica | 87 | 2.5 | NT | 0.05 | 8.9 | C/B |
| 5 | 37 | P1 | PVOH/Silica | 87 | 2.5 | 10.0 | 0.034 | 10.4 | C/B |
| 6 | 50 | P1 | PVOH/Silica | 87 | 2.9 | 10.5 | Fall off | 12.2 | C/B |
| C1 | 32 | P1 | PVAc | 0 | 2 | NT | 0.04 | 2.4 | D/cc |
| C2 | 35 | P1 | PVAc | 0 | 2 | 7.5 | NT | NT | NT |
| C3 | 36 | P1 | PVAc | 0 | 2 | 7.9 | 0.06 | 0.9 | D/cc |
| C4 | 40 | P1 | PVAc | 0 | 6 | 10.1 | 0.03 | 0.2 | D/cc |
| C5 | 41 | P1 | PVAc | 0 | 3.3 | 8.5 | 0.04 | 1.3 | D/cc |
| C6 | 41 | P1 | PVAc | 0 | 15 | 11.6 | 0.02 | 0.1 | D/cc |
| C7 | 42 | P1 | PVAc | 0 | 2 | NT | 0.03 | 2.8 | D/cc |
| C8 | 48 | P1 | PVAc | 0 | 2 | 6.6 | 0.06 | 1.9 | D/cc |
| C9 | 40 | P2c | PVAc/Silica | 62 | 3.2 | 11.4 | 0.04 | 2.2 | C/B |
| C10 | 76 | P3c | PVAc/Silica | 62 | 2 | 12.7 | Fall off | 4.3 | C/B |
| C11 | 55 | P4c | PVAc/Silica | 62 | 2 | 10.4 | NT | 4.1 | C/B |
| C12 | 55 | P5c | PVAc/Silica | 62 | 2 | 12.9 | 0.06 | 1.9 | C/B |
| C13 | 80 | P5c | PVAc/Silica | 62 | 2 | 14.8 | Fall off | 2.6 | C/B |
| C14 | 57 | P6c | PVAc/Silica | 62 | 2 | 11.0 | Fall off | 3.1 | C/B |

NT = not tested
C/B = failure at layer C/layer B interface
D/cc = failure at layer D/concrete interface Formulations 1 to 6 comprise a protective coating (layer C) that is substantially free of surfactant and comprise a releasable material (layer D) that includes nanoscale silica. These formulations exhibit excellent initial bond to concrete and very good blocking resistance (anything less than 0.1 pli is acceptable). Formulations 4, 5 and 6 also exhibit exceptional retention of bond to concrete after one month water immersion. Even though the releasable material layer comprises a water soluble polymer (polyvinyl alcohol), a high level of nanoscale silica provides for good bond to concrete and to the protective coating layer. Although not tested, it is expected that formulations 1, 2 and 3 would similarly exhibit good bond to concrete after water immersion. Formulations comprising polyvinyl alcohol alone in the releasable material layer were not tested because the surface of the membrane is slippery when wet, which makes the membrane somewhat undesirable from a commercial standpoint. This disadvantage is remedied by addition of nanoscale silica to the releasable material layer.

In contrast to the above, the comparative examples C9 to C14 include a surfactant in the protective coating layer (since these were all formulated with aqueous polymer emulsions) and exhibit poor retention of bond to concrete after water immersion. Failure occurs at the interface (C/B) between the protective coating (layer C) and the adhesive (layer B). Presumably water diffuses into this interface because of the hydrophilic nature of the protective coating resulting from the presence of the surfactant. Comparative examples C1 to C8 comprise a relatively surfactant free polymer in the protective coating. However, these examples do not comprise nanoscale silica in the releasable material layer. Failure occurs at the interface (D/cc) between the releasable material (layer D) and concrete (cc). Presumably water diffuses into this interface because of the hydrophilic nature of the releasable material layer.

Embodiments of the invention also exhibit good bond to concrete after UV exposure. For example, formulation 6 exhibited bond to concrete of 10.5 pli, 12.1 pli and 8.0 pli after exposure to 0, 28 and 56 mj, respectively, of UV radiation prior to casting concrete against the membrane.

The invention claimed is:

1. A waterproofing membrane comprising the following laminated layers:
    layer A comprising a carrier sheet;
    layer B comprising a waterproofing adhesive;
    layer C comprising a protective coating, wherein the protective coating is substantially free of surfactant and comprises an acrylic or methacrylic polymer or copolymer, an inorganic filler and a white pigment, the protective coating having a penetration ≤20 dmm and a reflectivity greater than or equal to 55% as measured by a reflectometer perpendicular to a surface illuminated at a 45° angle, and wherein the protective coating has a pigment volume concentration in terms of filler plus white pigment in the range of 30% to 80%; and
    layer D comprising a releasable material, wherein the releasable material comprises amorphous nanoscale silica and a polymeric binder; and
    wherein the laminated layers are arranged in the sequential order A-B-C-D.

2. The waterproofing membrane according to claim 1 wherein the nanoscale silica is present in an amount of 30% to 90% by volume of the silica plus polymeric binder.

3. The waterproofing membrane according to claim 1 wherein the nanoscale silica has a particle size of 0.1 nm to 150 nm.

4. The waterproofing membrane according to claim 1 wherein the polymeric binder in the releasable material comprises a water soluble polymer, an alkali soluble polymer, or a homopolymer or copolymer of polyvinyl acetate.

5. The waterproofing membrane according to claim 4 wherein the polymeric binder comprises a water soluble polymer selected from the group consisting of polyvinyl alcohol (PVOH), polyethylene oxide (PEO), water soluble cellulosic polymers including hydroxypropyl methyl cellulose and hydroxyethyl cellulose, hydrolyzed maleic anhydride polymers and copolymers, polyvinylpyrrolidone, sulfonated polystyrene, polysulfoethyl acrylate, poly(2-hydroxyethylacrylate), polyacrylamide, poly(acrylic acid) and alkali metal salts thereof, natural or synthetically modified polysaccharides, proteins, alginates, xanthan gums, and guar gums.

6. The waterproofing membrane according to claim 5 wherein the polymeric binder comprises polyvinyl alcohol.

7. The waterproofing membrane according to claim 4 wherein the polymeric binder comprises an alkali soluble polymer selected from the group consisting of copolymers of styrene and maleic anhydride, copolymers of styrene, maleic anhydride and half-ester of maleic anhydride, copolymers of acrylic acid and styrene and/or alpha-methyl styrene, hydroxypropyl methylcellulose acetate succinate, copolymers of methacrylic acid and methyl methacrylate, copolymers of methyl methacrylate, ethyl methacrylate and acrylic acid, copolymers of ethyl acrylate, methyl methacrylate, and acrylic acid, a rosin acid, a phenolic resin, and combinations of one or more of these.

8. The waterproofing membrane according to claim 4 wherein the polymeric binder comprises a homopolymer or copolymer of polyvinyl acetate.

9. The waterproofing membrane according to claim 1 wherein the carrier sheet has a thickness of about 0.05 to 2.0 mm; the waterproofing adhesive has a thickness of about 0.07 to2.0 mm; the protective coating has a thickness of about 0.008to 0.08mm; and the releasable material has a thickness of about 0.5 to15 µm.

10. The waterproofing membrane according to claim 1 wherein the protective coating) has a dry coating weight of about 20 g/m$^2$ to 90 g/m$^2$ on a dry solids basis; and wherein the releasable material has a dry coating weight of 1 g/m$^2$ to 15g/m$^2$.

11. The waterproofing membrane according to claim 1 wherein the filler in the protective coating is selected from the group consisting of calcium carbonate, silica, diatomaceous earth, barytes, magnesium silicates, talc, clay, and alumina trihydrate, and mixtures of two or more of these materials.

12. The waterproofing membrane according to claim 1 wherein the white pigment in the protective coating comprises titanium dioxide, and wherein the volume percent of white pigment comprises 5% to 3% by volume of filler plus white pigment.

13. The waterproofing membrane according to claim 1 wherein the carrier sheet comprises polyethylene, polypropylene, ethylene-propylene copolymers, ethylene-olefin copolymers, ethylene-vinyl acetate copolymers, polyvinyl acetate, polyethyl acrylate, polytetrafluoroethylene, polyvinylidene fluoride, polyethylene terephthalate, polyvinyl chloride or a combination of two or more of these materials.

14. The waterproofing membrane according to claim 1 wherein the waterproofing adhesive comprises a synthetic pressure sensitive adhesive or a rubber modified bitumen pressure sensitive adhesive.

15. The waterproofing membrane according to claim 14 wherein the waterproofing adhesive comprises a synthetic pressure sensitive adhesive comprising a butyl rubber based adhesive, a polyisobutylene based adhesive, a butyl based adhesive, an acrylic based adhesive, a vinyl ether based adhesive, a styrene-isoprene-styrene (SIS) based adhesive, a styrene-ethylene-butylene-styrene (SEBS) based adhesive, a styrene-butadiene-styrene (SBS) based adhesive, a styrene-butadiene rubber (SBR) based adhesive, or a combination of two or more of these materials.

16. The waterproofing membrane according to claim 1 wherein the membrane does not include a removable release sheet.

17. The waterproofing membrane according to claim 1 wherein
the nanoscale silica is present in an amount of 60% to 90% by volume of the silica plus polymeric binder;
the nanoscale silica has a particle size of 1 nm to 50 nm; and
the protective coating has a reflectivity from 65% to 85% as measured by a reflectometer perpendicular to a surface illuminated at a 45° angle, and wherein the pigment volume concentration of the filler plus white pigment is 40% to 70% based on total solids in the protective coating.

18. A method of waterproofing a concrete structure comprising applying a waterproofing membrane according to claim 1 to a building substrate or concrete form with the releasable material of said membrane facing the area into which the concrete will be cast, and casting concrete such that the concrete contacts the releasable material of the membrane.

19. A method of making a waterproofing membrane according to claim 1, comprising the following steps:

(S1) coating the releasable material layer onto the plastic film and drying;

(S2) coating the protective coating layer onto the releasable material layer, drying, and winding the releasable material layer, the plastic film, and the protective coating layer into a roll;

(S3) coating the waterproofing adhesive layer onto the carrier sheet;

(S4) unwinding the three layer roll comprising the protective coating layer, the releasable material layer, and the plastic film and laminating the protective coating layer to the waterproofing adhesive layer; and (S5) removing the plastic film from the releasable material layer and winding the four layer construction comprising the releasable material layer, the protective coating layer, the waterproofing adhesive layer, and the carrier sheet into a roll, whereby the carrier sheet is located outwardly of the roll.

* * * * *